United States Patent
Nguyen et al.

(10) Patent No.: US 10,114,874 B2
(45) Date of Patent: Oct. 30, 2018

(54) SOURCE QUERY CACHING AS FAULT PREVENTION FOR FEDERATED QUERIES

(71) Applicant: Red Hat, Inc., Raleigh, NC (US)

(72) Inventors: Filip Nguyen, Brno (CZ); Filip Eliáš, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 300 days.

(21) Appl. No.: 14/188,279

(22) Filed: Feb. 24, 2014

(65) Prior Publication Data

US 2015/0242464 A1    Aug. 27, 2015

(51) Int. Cl.
G06F 17/30 (2006.01)
G06F 11/30 (2006.01)

(52) U.S. Cl.
CPC ........ G06F 17/30545 (2013.01); G06F 11/30 (2013.01); G06F 17/30457 (2013.01)

(58) Field of Classification Search
CPC ......... G06F 17/30457; G06F 17/30545; G06F 11/30
USPC .......................................................... 707/713
See application file for complete search history.

(56) References Cited

U.S. PATENT DOCUMENTS

| | | | | |
|---|---|---|---|---|
| 7,013,303 B2* | 3/2006 | Faybishenko | ..... | G06F 17/30867 |
| 7,287,048 B2* | 10/2007 | Bourbonnais | ..... | G06F 17/30566 |
| 7,395,258 B2* | 7/2008 | Altinel | ................ | G06F 17/3048 |
| 7,580,971 B1* | 8/2009 | Gollapudi | ......... | G06F 17/30474 |
| | | | | 709/203 |
| 7,668,807 B2* | 2/2010 | Dettinger | .......... | G06F 17/30427 |
| | | | | 707/718 |
| 7,680,771 B2* | 3/2010 | Cialini | .............. | G06F 17/30306 |
| | | | | 707/999.003 |
| 7,689,538 B2* | 3/2010 | Li | ...................... | G06F 17/30457 |
| | | | | 707/999.002 |
| 7,720,839 B2* | 5/2010 | Barsness | ........... | G06F 17/30979 |
| | | | | 707/713 |
| 7,792,823 B2* | 9/2010 | Cain | ................. | G06F 17/30336 |
| | | | | 707/715 |
| 7,827,159 B2* | 11/2010 | Dettinger | .......... | G06F 17/30864 |
| | | | | 707/694 |
| 7,853,576 B2* | 12/2010 | Narang | ............. | G06F 17/30575 |
| | | | | 707/705 |
| 7,877,381 B2* | 1/2011 | Ewen | ................. | G06F 17/30463 |
| | | | | 707/719 |

(Continued)

OTHER PUBLICATIONS

Alfredo Goni et al., An Optimal Cache for a Federated Database System, Journal of Intelligent Information Systems, 1007, pp. 125-155, © Kluwer Academic Publishers, The Netherlands.

*Primary Examiner* — Miranda Le
(74) *Attorney, Agent, or Firm* — Haynes and Boone, LLP

(57) ABSTRACT

An example system for processing a federated query includes a query proxy that receives a federated query including a plurality of source queries and receives an indication that a failed set of one or more source queries failed to execute successfully. Each source query is specific to an autonomous data source belonging to a federation. The system also includes a data federation engine that identifies a plurality of autonomous data sources to which to send the plurality of source queries. The plurality of autonomous data sources belong to the federation. The system further includes a query fail analyzer that updates a data structure to reflect the unsuccessful execution of one or more source queries of the failed set.

18 Claims, 6 Drawing Sheets

(56) References Cited

U.S. PATENT DOCUMENTS

| | | | |
|---|---|---|---|
| 7,890,496 B2 | 2/2011 | Li et al. | |
| 7,925,665 B2* | 4/2011 | Schneider | G06F 17/30566 707/716 |
| 7,945,551 B1* | 5/2011 | Alpern | G06F 17/30545 707/706 |
| 7,945,577 B2 | 5/2011 | Altinel et al. | |
| 8,095,828 B1* | 1/2012 | Westenberg | G06F 11/0727 714/20 |
| 8,140,490 B2* | 3/2012 | Aboulnaga | G06F 17/30339 707/690 |
| 8,180,789 B1* | 5/2012 | Wasserman | G06F 17/30389 707/707 |
| 8,200,698 B2 | 6/2012 | Friedlander et al. | |
| 8,219,580 B2* | 7/2012 | Bumgarner | G06F 17/30286 707/770 |
| 8,244,699 B2* | 8/2012 | Bolohan | G06F 17/30297 707/695 |
| 8,255,504 B1* | 8/2012 | Thornton | G06F 17/30002 709/223 |
| 8,352,458 B2* | 1/2013 | Aggarwal | G06F 17/30489 707/713 |
| 8,386,515 B2* | 2/2013 | Bent | G06F 17/30545 707/627 |
| 8,412,746 B2* | 4/2013 | Fox | G06F 17/30292 707/609 |
| 8,527,473 B1* | 9/2013 | Brown | G06F 17/30557 707/675 |
| 8,538,985 B2 | 9/2013 | Betawadkar-Norwood et al. | |
| 8,667,010 B2* | 3/2014 | Wu | G06F 17/30584 707/769 |
| 8,676,785 B2* | 3/2014 | Ordonez | G06F 17/3043 707/706 |
| 8,774,057 B2* | 7/2014 | Barsness | G06F 17/30471 370/255 |
| 8,825,596 B2* | 9/2014 | Simon | G06F 17/30433 707/609 |
| 9,317,555 B2* | 4/2016 | Jin | G06F 17/30477 |
| 9,430,505 B2* | 8/2016 | Padmanabhan | G06F 17/303 |
| 9,600,545 B2* | 3/2017 | Pryce | G06F 17/303 |
| 2002/0161757 A1* | 10/2002 | Mock | G06F 17/30386 |
| 2004/0015504 A1* | 1/2004 | Ahad | G06F 17/3048 |
| 2004/0133538 A1* | 7/2004 | Amiri | G06F 17/30457 |
| 2004/0230571 A1* | 11/2004 | Robertson | G06F 17/30312 |
| 2004/0236726 A1* | 11/2004 | Ewing | G06F 17/3048 |
| 2005/0138015 A1* | 6/2005 | Dageville | G06F 17/30306 |
| 2005/0138173 A1* | 6/2005 | Ha | H04L 29/12113 709/203 |
| 2006/0190434 A1* | 8/2006 | Dettinger | G06F 17/30427 |
| 2007/0011176 A1* | 1/2007 | Vishnubhotla | G06Q 10/06 |
| 2007/0083526 A1* | 4/2007 | Srivastava | G06F 17/30289 |
| 2007/0219972 A1* | 9/2007 | Cragun | G06F 17/30545 |
| 2008/0177770 A1* | 7/2008 | Friedlander | G06F 17/30566 |
| 2009/0112794 A1* | 4/2009 | Dettinger | G06F 17/30893 |
| 2009/0177697 A1* | 7/2009 | Gao | G06F 17/30457 |
| 2010/0023502 A1* | 1/2010 | Marlow | G06F 17/30864 707/E17.017 |
| 2013/0080416 A1* | 3/2013 | Meade | G06F 17/30442 707/713 |
| 2013/0086039 A1* | 4/2013 | Salch | G06F 17/30463 707/717 |
| 2014/0244680 A1* | 8/2014 | Chandran | G06F 17/30427 707/760 |
| 2014/0317084 A1* | 10/2014 | Chaudhry | G06F 17/3048 707/713 |

* cited by examiner

SOURCE QUERY CACHING AS FAULT PREVENTION FOR FEDERATED QUERIES

FIELD OF DISCLOSURE

The present disclosure generally relates to a federated system, and more specifically to fault prevention for a federated system.

BACKGROUND

A federated system is a collection of cooperating but autonomous data sources belonging to a federation. The autonomous data sources belonging to the federation cooperate with each other yet maintain some degree of autonomy. A federated system allows a client to send requests to multiple data sources with the use of a single federated query. A federated query is a query that contains several source queries, and each source query is specific to a data source. A source query that is specific to a data source is written in a format that is understandable by the data source and may be executable at the data source.

Today, data replication and fail-over are important properties of data sources and enterprise systems, and this is emphasized in data federation engines and service-oriented architectures. In a federated system, a federated server may receive a federated query from the client and send each source query embedded in the federated query to the appropriate data source for execution. When a client submits a federated query, the federated server may return a result of the federated query by retrieving results from the applicable data sources.

In a federated environment, when a federated system federates many different data sources, a higher probability exists that some data sources may not be available at some time. While conducting data federation, if a source query is sent to a data source that is unavailable, the unavailable data source is unable to respond to the source query. For example, if even a single data source is unavailable among the many other data sources, the federated query as a whole is usually rendered unusable. Accordingly, the federation server may be prevented from responding to the federated query because the result would have missing data that is stored at the unavailable data source. A solution to this problem is quite complicated because data federation aims to work with large amounts of data. Further, the solution to this problem becomes more complex as more autonomous data sources are added to the federation.

Today, a system may cope with this problem by introducing high-availability data sources, which is a valid approach in standard corporate environments. In the case of data federation, however, the data source is typically not under the control of the data federation architect.

BRIEF SUMMARY

It may be desirable to perform actions to prevent a federated query from failure. Methods, systems, and techniques for processing a federated query are provided.

According to an embodiment, a system for processing a federated query includes a query proxy that receives a federated query including a plurality of source queries and receives an indication that a failed set of one or more source queries of the plurality of source queries failed to execute successfully. Each source query of the plurality of source queries is specific to an autonomous data source belonging to a federation. The system also includes a data federation engine that identifies a plurality of autonomous data sources to which to send the plurality of source queries. The plurality of autonomous data sources belong to the federation. The system further includes a query fail analyzer that updates a data structure to reflect the unsuccessful execution of one or more source queries of the failed set. The system also includes a federated server coupled over a network. The federated server executes at least one of the query proxy, the data federation engine, and the query fail analyzer.

According to another embodiment, a method of processing a federated query includes receiving at a query proxy a federated query including a plurality of source queries. Each source query of the plurality of source queries is specific to an autonomous data source belonging to a federation. The method also includes identifying a plurality of target autonomous data sources to which to send the plurality of source queries. The plurality of target autonomous data sources belong to the federation. The method further includes receiving an indication that a failed set of one or more source queries of the plurality of source queries failed to execute successfully. The method also includes after receiving the indication, updating a data structure to reflect the unsuccessful execution of one or more source queries of the failed set.

According to another embodiment, a non-transitory machine-readable medium including a plurality of machine-readable instructions that when executed by one or more processors is adapted to cause the one or more processors to perform a method including: receiving a federated query including a plurality of source queries, each source query of the plurality of source queries being specific to an autonomous data source belonging to a federation; identifying a plurality of target autonomous data sources to which to send the plurality of source queries, the plurality of target autonomous data sources belonging to the federation; receiving an indication that a failed set of one or more source queries of the plurality of source queries failed to execute successfully; and after receiving the indication, updating a data structure to reflect the unsuccessful execution of one or more source queries of the failed set.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Target Data Sources are Available
   A. Federated Query Successfully Executes
   B. Federated Query Does Not Successfully Execute
      1. Fail Statistics
      2. Clean Fail Statistics
IV. Cache Failed Source Queries
   A. Select Source Queries to Cache
   B. Cache Selected Source Queries and Results from Selected Source Queries
V. One or More Target Data Sources is Not Available
VI. Example Methods
VII. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A target data source may refer to a data source to which a query is to be sent. At the time of running a federated query, it may be desirable to ensure that all target data sources to which source queries embedded in the federated query are to be sent are available. If one or more data sources fails among the many other data sources, the federated query as a whole is usually rendered unusable. The present disclosure provides techniques to minimize failures of a federated query.

According to another embodiment, a method of processing a federated query includes receiving at a query proxy a federated query including a plurality of source queries. Each source query of the plurality of source queries is specific to an autonomous data source belonging to a federation. The method also includes identifying a plurality of target autonomous data sources to which to send the plurality of source queries. The plurality of target autonomous data sources belong to the federation. The method further includes receiving an indication that a failed set of one or more source queries of the plurality of source queries failed to execute successfully. The method also includes after receiving the indication, updating a data structure to reflect the unsuccessful execution of one or more source queries of the failed set.

Unless specifically stated otherwise, as apparent from the following discussion, it is appreciated that throughout the description, discussions utilizing terms such as "receiving", "identifying", "updating", and "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
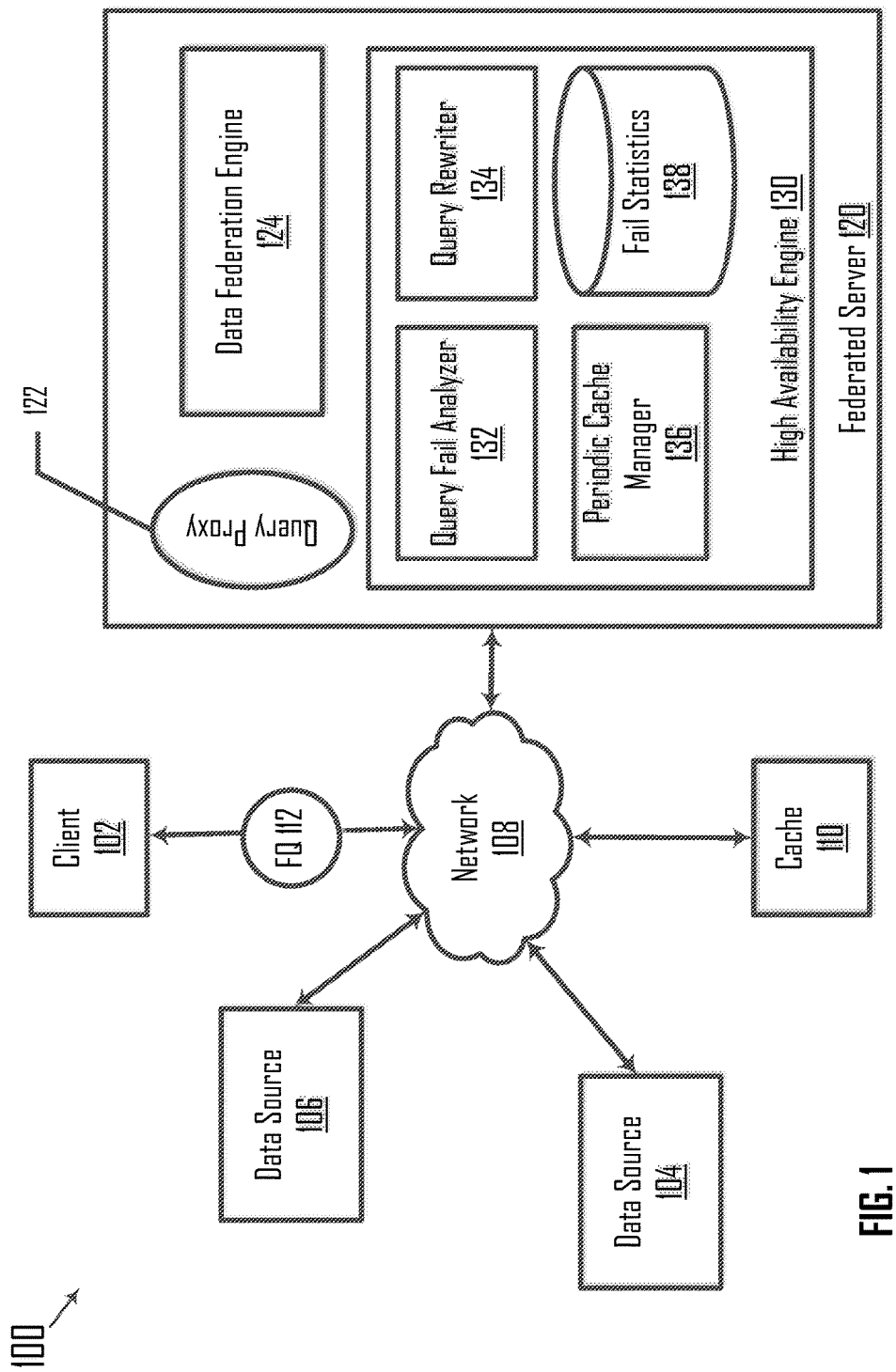
FIG. 1 is a block diagram illustrating a federated system for processing a federated query, according to an embodiment.

FIG. 1 is a block diagram illustrating a federated system 100 for processing a federated query, according to an embodiment. System 100 includes a client 102, data source 104, and data source 106 coupled via a network 108. Although one client and two data sources are illustrated, this is not intended to be limiting, and system 100 may include one or more clients and one or more data sources.

Client 102 may be a personal computer (PC), workstation, mobile device (e.g., a mobile phone, personal digital assistant (PDA), tablet, and laptop), game console, set-top box, kiosk, embedded system, or other device having at least one processor and memory. Client 102 may also be an application run on a PC, server, database, etc. Additionally, client 102 may be a fat client (e.g., a client that performs local processing and data storage), a thin client (e.g., a client that performs minimal or no local processing and minimal to no data storage), and/or a hybrid client (e.g., a client that performs local processing but little to no data storage).

Data sources 104 and 106 may be autonomous data sources that belong to a federation. The autonomous data sources may be external systems that store data accessible over network 108. In an example, data sources 104 and 106 are heterogeneous data sources that accept different query formats relative to each other. In an example, data source 104 is an ORACLE® database provided by ORACLE®, and data source 106 is a DB2® database provided by IBM®. Trademarks are the properties of their respective owners. In another example, data source 104 is an ORACLE® database, and data source 106 is a web service.

Network 108 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

System 100 also includes a cache 110 and a federated server 120 coupled via network 108. Federated server 120 may be a single machine or may include multiple interconnected machines (e.g., machines configured in a cluster). Client 102 may send a federated query 112 to federated server 120 for processing. Federated query 112 includes a plurality of source queries that may each be sent to one or more different target data sources belonging to the federation. Client 102 may submit the high-level federated query to federated server 120 for processing without knowing where the data actually resides (e.g., in data source 104 or data source 106).

Federated server 120 includes a query proxy 122, data federation engine 124, and high availability engine 130. Query proxy 122, data federation engine 124, and high availability engine 130 may execute on a computing device having at least one processor and memory. Query proxy 122 is an integration point of high availability engine 130 to data federation engine 124, as discussed further below. In an example, query proxy 122 intercepts federated query 112 sent from client 102 and also intercepts sending of the results back to client 102.

Query proxy 122 may intercept federated query 112 and send it to data federation engine 124 to break down federated query 112 into a federated query plan. The federated query plan defines one or more target data sources belonging to the federation and one or more source queries to be executed against each of the one or more data sources. Each source query of the plurality of source queries is specific to an autonomous data source belonging to the federation. Data federation engine 124 handles the distribution of the embedded source queries to the target autonomous data sources. The source queries are distributed to the data sources in accordance with the federated query plan, and the respective source queries are executed asynchronously against the data sources. Data federation engine 124 enables client 102 to treat data sources belonging to the federation as one virtual database and access them with the use of a single federated query.

In an example, the federated query is a federated join query. Data federation engine 124 may provide a common view of many different data sources. A data view is a basic building block of data federation and may be used in the scope of one federated query.

Figure 2:
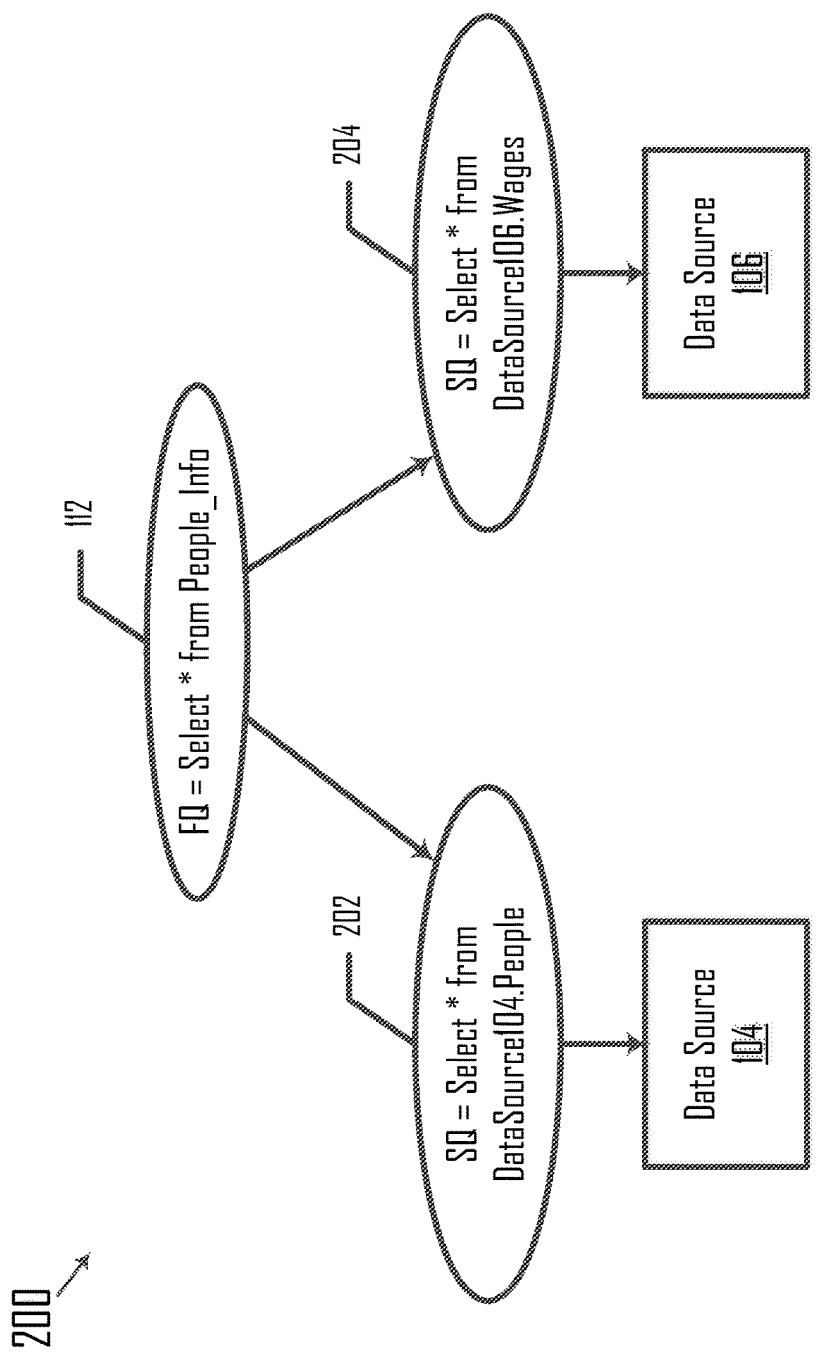
FIG. 2 is an example of a federated query, according to an embodiment.

FIG. 2 is an example 200 of a federated query, according to an embodiment. In the example illustrated in FIG. 2, federated query 112 is a query, "Select * from People_Info", that retrieves information about people in an organization (e.g., employees of the organization and wages). Query proxy 122 may receive federated query 112 and pass federated query 112 along to data federation engine 124. Data federation engine 124 may break federated query 112 down into two different source queries 202 and 204. Source query 202 is a query, "Select * from DataSource104.People", where "DataSource104" is a source of the table "People". In such an example, source query 202 is specific to data source 104, which stores at least a table "People" from which data is retrieved based on execution of source query 202 against data source 104. Source query 204 is a query, "Select * from DataSource106.Wages", where "DataSource106" is a source of the table "Wages". In such an example, source query 204 is specific to data source 106, which stores at least a table "Wages" from which data is retrieved based on execution of source query 204 against data source 106. In an example, source query 202 is not executable at data source 106, and source query 204 is not executable at data source 104.

As discussed, data federation engine 124 may break down federated query 112 into source queries 202 and 204 that are eventually submitted to target autonomous data sources for processing and execution. Query proxy 122 may determine whether an autonomous data source is unavailable (or available) via communication with data federation engine 124. In an embodiment, data federation engine 124 identifies a plurality of autonomous data sources to which to send the plurality of source queries embedded in federated query 112. Data federation engine 124 may determine whether the plurality of autonomous data sources is unavailable (or available). A data source may be unavailable if, for example, it is offline.

III. Target Data Sources are Available

A. Federated Query Successfully Executes

In an example, data federation engine 124 identifies data sources 104 and 106 as the target data sources to which to send source queries 202 and 204, respectively, determines that data sources 104 and 106 are available, and passes this information along to query proxy 122. When the plurality of target autonomous data sources is determined to be available, data federation engine 124 may send a message to query proxy 122, where the message indicates that each target data source is available. In such an example, query proxy 122 may decide that it is safe to execute the federated query and may instruct data federation engine 124 to execute the federated query plan.

Data federation engine 124 may receive the instruction to execute the federated query plan and may then proceed to send each of the source queries embedded in federated query 112 to the appropriate target data source for execution. If federated query 112 successfully executes, data federation engine 124 may receive the results of the executed source queries and send the results to query proxy 122. Query proxy 122 may then pass the results along to client 102.

B. Federated Query does not Successfully Execute

If federated query 112 does not successfully execute, however, data federation engine 124 may retrieve the error results based on the unsuccessful execution of federated query 112. The error results may contain information about failed source queries. Federated query 112 may fail because, for example, a target data source that data federation engine 124 had previously thought was available was actually unavailable. In such an example, one or more source queries embedded in federated query 112 may fail to execute successfully.

If federated query 112 does not successfully execute, data federation engine 124 may send query proxy 122 an indication that a failed set of one or more source queries embedded in federated query 112 failed to execute successfully. Data federation engine 124 may send query proxy 122 a message indicating which source queries failed to execute successfully. The one or more source queries that failed to execute successfully may be referred to as a failed set. In an example, after receiving the indication that the failed set of one or more source queries failed to execute successfully, query proxy 122 may send to client 102 a message indicating that execution of federated query 112 was unsuccessful. In such an example, federated server 120 may not return any results based on the federated query to client 102 because one or more source queries failed to execute successfully.

1. Fail Statistics

High availability engine 130 includes a query fail analyzer 132, query rewriter 134, periodical cache manager 136, and fail statistics 138. Query proxy 122 processes the message including the failed set and sends the failed set to query fail analyzer 132 to process and analyze. Query fail analyzer 132 maintains fail statistics 138 based on the failure of one or more failed source queries. Fail statistics 138 may be accessible to each component of high availability engine 130 to ensure that the statistics remain up-to-date. Fail statistics 138 may include a data structure (e.g., a table "Source Fail Table") that stores information about failed source queries.

Query fail analyzer 132 may receive the failed set from query proxy 122 and update a data structure to reflect the unsuccessful execution of one or more source queries of the failed set. The data structure may be stored in fail statistics 138. In an embodiment, query fail analyzer 132 determines whether one or more source queries of the failed set of source queries is stored in the data structure. The failed set may include a first subset of one or more source queries that is not yet stored in the data structure and a second subset of one or more source queries that has already been stored in the data structure. When the first subset of the failed set is determined to not be stored in the data structure, query fail analyzer 132 may update the data structure by inserting into the data structure one or more entries including one or more source queries of the first subset (e.g., each source query of the first subset) and metadata of the respective source query. The metadata may include a federated query identifier (ID) that identifies the federated query and may also include a data source ID that identifies a target data source to which the source query was sent.

When the second subset of the failed set is determined to be stored in the data structure, query fail analyzer 132 may update the data structure by updating metadata of the one or more entries corresponding to the second subset stored in the data structure. In an example, updating the metadata may include inserting a timestamp of the failure into the data structure and updating a number of times the respective source query has failed. In such an example, query fail analyzer 132 may update the number of times the respective source query has failed by adding the timestamp of the particular failure to the data structure.

Table A provides an example of a data structure that stores data about one or more failed source queries.

TABLE A

| Source Query | Fails | Federated Query ID | Data Source ID |
|---|---|---|---|
| Select * from People | Nov. 13, 2012 | 1 | 1 |
| Select * from Accounts | Nov. 13, 2012; Nov. 15, 2012; Nov. 17, 2012 | 1 | 2 |
| Select * from People where name like 'T %' | Nov. 13, 2012 | 2 | 1 |
| Select * from Addresses where person_id = 34 | Nov. 13, 2012 | 3 | 1 |

In Table A, the data structure is a table that includes four columns, "Source Query," "Fails," "Federated Query ID," and "Data Source ID." Column "Source Query" indicates one or more source queries that failed at one point in time. Each source query in Table A includes a source table from which to retrieve data. For example, source queries "Select * from People" and "Select * from People where name like 'T %'" retrieve data from table "People", which is the source table embedded in the aforementioned source queries. In another example, source query "Select * from Accounts" retrieves data from the table "Accounts", which is the source table embedded in the aforementioned source query. In another example, source query "Select * from Addresses where person_id=34" retrieves data from the table "Addresses", which is the source table embedded in the aforementioned source query. Although the source queries listed in Table A each include only one source table, this is not intended to be limiting and a source query may include one or more source tables.

Column "Fail" indicates the date(s) that such source query failed. Query fail analyzer 132 may timestamp each of the failed source queries with their fail time(s). In Table A, the column "Fail" also indicates the number of times a particular source query failed. For example, the source query "Select * from People" in Table A has one date (11/13/12), indicating that this particular source query failed one time. In another example, the source query "Select * from Accounts" has three dates (11/13/12, 11/15/12, and 11/17/12), indicating that this particular source query failed three times.

Column "Federated Query ID" indicates the federated query ID of a federated query in which the particular source query was embedded, and column "Data Source ID" indicates the data source ID of the target data source to which the particular source query was sent. The federated query ID and/or data source ID may be unique identifiers.

2. Clean Fail Statistics

It may be desirable to periodically clean the data in Table A such that old data is deleted. The determination of whether data is old may be configurable by an administrator. In an embodiment, query fail analyzer 132 deletes entries in the data structure that are older than a particular time interval. The time interval may be configurable by an administrator.

Referring to Table A as an example, if query fail analyzer 132 determines that any source query having a timestamp of Nov. 14, 2012 or older is old and should be deleted, query fail analyzer 132 may delete the first, third, and fourth rows of Table A along with the first date of column "Fails" in row 2. In such an example, after query fail analyzer 132 cleans the table, Table A may have only one row entry. Table B provides an example of such a data structure after it has been cleaned by query fail analyzer 132.

TABLE B

| Source Query | Fails | Federated Query ID | Data Source ID |
|---|---|---|---|
| Select * from Accounts | Nov. 15, 2012; Nov. 17, 2012 | 1 | 2 |

IV. Cache Failed Source Queries

Periodic cache manager 136 selects source queries stored in fail statistics 138 and caches the selected source queries (e.g., in cache 110). Cache 110 is an entity that is external to federated server 120. In an example, cache 110 may be an arbitrary database management system (DBMS) that is coupled to data federation engine 124. In an example, periodic cache manager 136 maintains cache 110 by creating cache tables in cache 110 and caching results from queries into the cache tables such that a result of source queries that previously failed are accessible. Periodic cache manager 136 may also delete cache tables from cache 110.

A. Select Source Queries to Cache

Periodic cache manager 136 may periodically determine which source queries from fail statistics 138 to cache. It may be desirable to cache those source queries that have a higher failure rate compared to other source queries stored in fail statistics 138. Periodic cache manager 136 may leverage the fact that a commonly used source query that may fail may have a higher probability of being the culprit of possible fails for other federated queries. Periodic cache manager 136 may mitigate this issue by pinpointing those particular source queries.

In an embodiment, periodic cache manager 136 determines which source queries to cache by implementing the routine in Table C.

TABLE C

Input: Source Fail Table (e.g., Table A)
Output: Ordered list of source queries to be potentially cached
1. var result: list of source queries
2. sft := make a copy of source fail table
3. for each f: federated_query_IDs in sft
4.     scoref[f] := sum number of fails with f as a federated query
5. end
6. for each s: data_source_IDs in sft
7.     scores[s] := sum scoref[x], where x is each federated query containing s
8. end
9. order sft by scores, descending
10. result := select such number of queries in sft to not exceed the size of cache Periodic cache manager 136 may take a source fail table (e.g., Table A) as an input and output an ordered list of source queries. The selected source queries may be based on the metadata stored in the source fail table. Periodic cache manager 136 may select a number of top source queries from the ordered list for caching.

In an example, periodic cache manager 136 takes Table A as input. As illustrated at line 2 of Table C, periodic cache manager 136 may create "sft", a copy of Table A. As illustrated at lines 3-5 of Table C, periodic cache manager 136 may retrieve all distinct federated query IDs in "sft" and add up the fail counts of the source queries that failed as part of the particular federated query "f". Using Table A as an input, the "scoref[f]" associative array may look as follows: scoref[1]=4 (e.g., 1+3); scoref[2]=1; scoref[3]=1.

As illustrated at lines 6-8 of Table C, periodic cache manager 136 may retrieve all distinct data source IDs in "sft" and add up the "scoref" associative array according to which federated queries the particular source queries are being run. In keeping with the above example, the "scores[s]" associative array may look as follows: scores[1]=6 (e.g., scoref[1]+scoref[2]+scoref[3]=6); and scores[2]=4 (e.g., scoref[1]=4).

Periodic cache manager 136 may then rearrange the entries stored in "sft" based on a descending order of the associative array, "scores[s]", and select a number of source queries to cache (e.g., the top twenty). The number of selected queries to cache may be configured by an administrator and may depend on a size of cache 110. Cache 110 may be a small amount of memory.

B. Cache Selected Source Queries and Results from Selected Source Queries

After periodic cache manager 136 selects the source queries to cache, periodic cache manager 136 may submit them to their respective target data sources for execution. Periodic cache manager 136 may retrieve the results of the source queries and store the selected source queries along with their results into cache 110. Thus, cache 110 may store a copy of source queries that have previously failed along with their results for later retrieval. For example, if periodic cache manager 136 selects source query 202, which is specific to data source 104, periodic cache manager 136 may submit source query 202 to data source 104 and retrieve results based on the execution of source query 202. Periodic cache manager 136 may receive the results and store source query 202 along with the results into cache 110. Thus, if query proxy 122 receives a federated query including source query 202 at a later point in time and data source 104 is unavailable during federation, the results based on execution of source query 202 may be retrieved from cache 110.

A source query includes a source table from which to retrieve data. For each source query of a selected set of source queries, periodic cache manager 136 may identify a source table included in the respective source query and determine a cache table name. Periodic cache manager 136 may create in cache 110 a table having the cache table name and store a result of the respective source query into the table identified by the cache table name.

Periodic cache manager 136 may determine the cache table name based on the name of the identified source table. Periodic cache manager 136 may determine the cache table name in a variety of ways. In an embodiment, periodic cache manager 136 determines the cache table name by identifying a source table name of the identified source table and adding a suffix to the source table name. In an example, periodic cache manager 136 identifies source table "People" in the source query "Select * from People" and adds a suffix (e.g., "_cached) to the identified source table name. In such an example, periodic cache manager 136 may create in cache 110 a cache table having the cache table name "People_cached", which corresponds to the table "People" stored in an autonomous data source (e.g., data source 104). Periodic cache manager 136 may retrieve the result from the source query "Select * from People" and store the result in "People_cached" in cache 110 along with the source query. Other ways to determine cache table names are within the scope of the disclosure (e.g., adding a prefix).

Accordingly, cache 110 may store a subset of data from one or more target data sources and be accessed if a target data source becomes unavailable in the future. Further, periodic cache manager 136 may periodically refresh its cached tables in cache 110. In an example, periodic cache manager 136 may perform the routine illustrated in Table C when a time interval has passed. In an example, the time interval may be in seconds or minutes and is configurable by an administrator. Other time intervals (e.g., hours, days, months, etc.) are within the scope of this disclosure.

V. One or More Target Data Sources is Not Available

When one or more data sources of the plurality of target autonomous data sources is determined to be unavailable, query proxy 122 may pass federated query 112 to query rewriter 134 to rewrite. Query proxy 122 may also pass to query rewriter 134 information regarding which data sources were unavailable. Query rewriter 134 may receive federated query 112, produce substitution of one or more source tables included in federated query 112, and produce a new federated query that is executed (rather than federated query 112 being executed). In an example, query rewriter 134 identifies an embedded source query that is specific to an unavailable data source, replaces the identified source query with a rewritten source query, and generates another federated query for execution.

In an embodiment, for each unavailable data source, query rewriter 134 rewrites one or more source queries targeted to the respective unavailable data source. In an example, query rewriter 134 rewrites a failed source query by renaming a source table name included in the failed source query. In such an example, query rewriter 134 may rewrite source table names of the source tables included in federated query 112. The rewritten source table names correspond to information stored in tables that are unavailable. A table may be unavailable because the table is stored at an unavailable data source. Rewriting the source table name may include changing a table name included in the identified source query.

Figure 3:
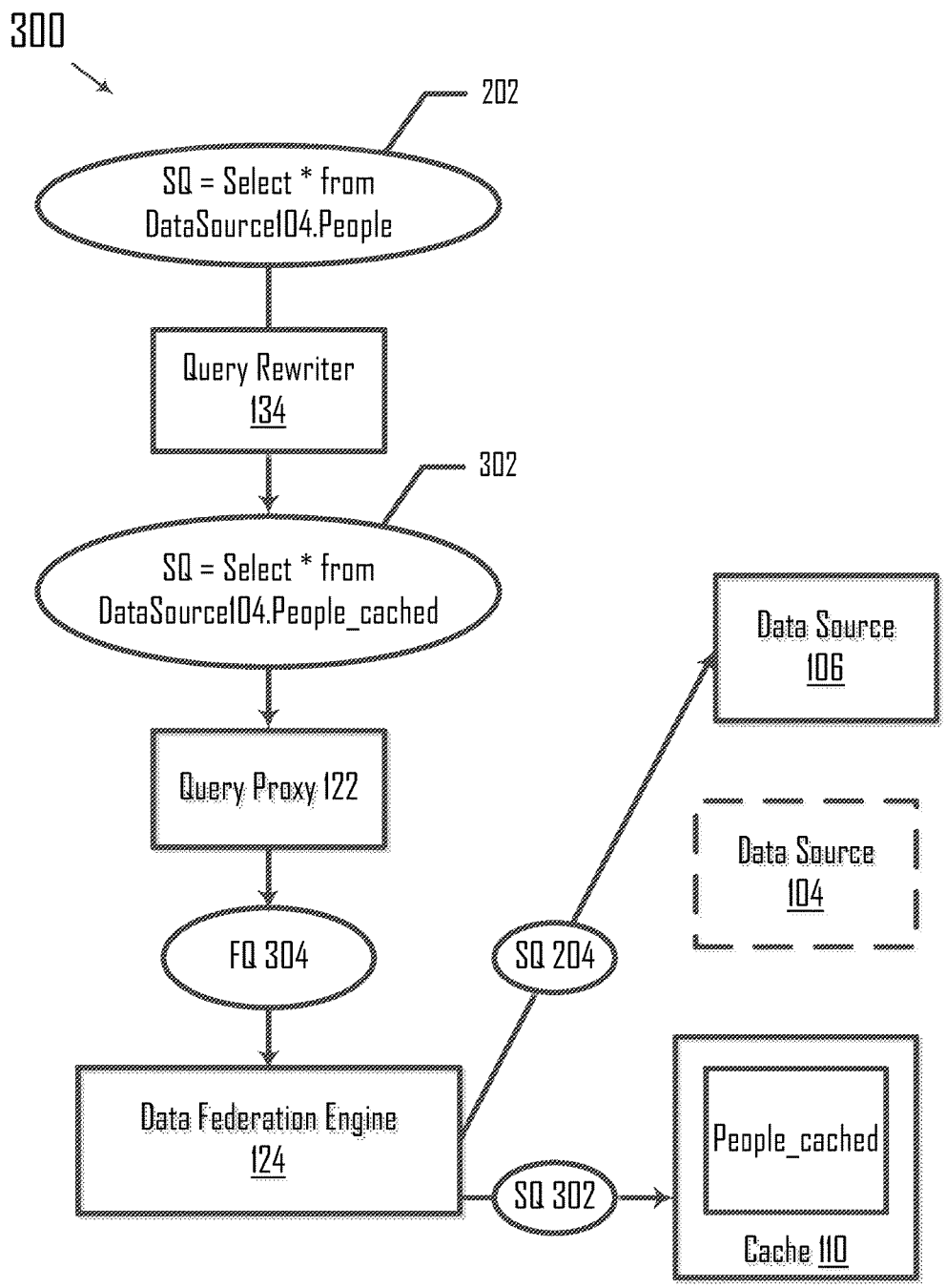
FIG. 3 is a block diagram illustrating a source query rewritten by a query rewriter, according to an embodiment.

In an example, data federation engine 124 determines that data source 104 is unavailable and passes this information along to query proxy 122. Query proxy 122 may send federated query 112 to query rewriter 134, which rewrites one or more embedded source queries that are specific to the unavailable data source (e.g., data source 104). FIG. 3 is a block diagram 300 illustrating source query 202 rewritten by query rewriter 134, according to an embodiment. Source query 202 is specific to data source 104, which is an unavailable data source as depicted by the dashed lines in FIG. 3. Query rewriter 134 obtains source query 202, identifies in source query 202 the source table "People" from which to retrieve data, and renames the identified source table as "People_cached". In the example illustrated in FIG. 3, query rewriter 134 changes the name of the source table identified in the failed source query by appending the suffix "_cached" to the name of the identified source table. Accordingly, query rewriter 134 produces a source query 302 "Select * from DataSource104.People_cached" based on source query 202 "Select * from DataSource104.People". In such an example, the suffix "_cached" becomes a reserved table name and no table names can be named with the suffix "_cached".

It is important to note that periodic cache manager 136 and query rewriter 134 may perform the same actions to determine a cache table name. Periodic cache manager 136 may store tables in cache 110 using a specific technique to rename the identified source table and query rewriter 134 may use the same technique to retrieve information from the corresponding cache table stored in cache 110. Other techniques to rename the source tables are within the scope of this disclosure. For example, periodic cache manager 136 may maintain a data structure that includes mappings from a source table name to a cache table name. Given a source table name, query rewriter 134 may access the mappings to retrieve the appropriate cache table name.

In an example, when one or more target data sources of the plurality of target autonomous data sources is determined to be unavailable, query proxy 122 obtains federated query 302 (different from federated query 112), where federated query 302 includes a second plurality of source queries. In FIG. 3, query rewriter 134 sends source query 302 to query proxy 122, which then generates a new federated query 304 different from federated query 112. Federated query 304 includes second plurality of source queries 302 and 204. At least one source query embedded in federated query 302 is specific to a target data source that is not a target data source of federated query 112.

Query proxy 122 sends federated query 304 to data federation engine 124 to break down into a federated query plan. Query proxy 122 may send a communication that causes each source query included in the second plurality of source queries to be sent to a target data source specific to the respective source query. When data federation engine 124 executes the federated query plan, data federation engine 124 sends source query 302 to cache 110 and sends source query 204 to data source 106 for execution. Data federation engine 124 may retrieve the results from these data sources and pass them along to query proxy 122, which then sends them to client 102. The results are responsive to federated query 112. Accordingly, query rewriter 134 may transparently fix a source query and retrieve cached data in the place of data that is stored at an unavailable data source. Federated server 120 improves the reliability of data federation engine 124. Even if a target data source is unavailable, federated server 120 may prevent a federated query from failing by caching a result of one or more source queries embedded in a federated query. If the data is not cached in cache 110, however, federated query 304 may fail.

As discussed above and further emphasized here, FIGS. 1-3 are merely examples, which should not unduly limit the scope of the claims. For example, it should be understood that one or more modules or components in FIG. 1 (e.g., query proxy 122, data federation engine 124, query fail analyzer 132, query rewriter 134, and periodic cache manager 136) may be combined with another module or component. It should also be understood that one or more modules or components in FIG. 1 may be separated into more than one module or component.

VI. Example Methods

Figure 4:
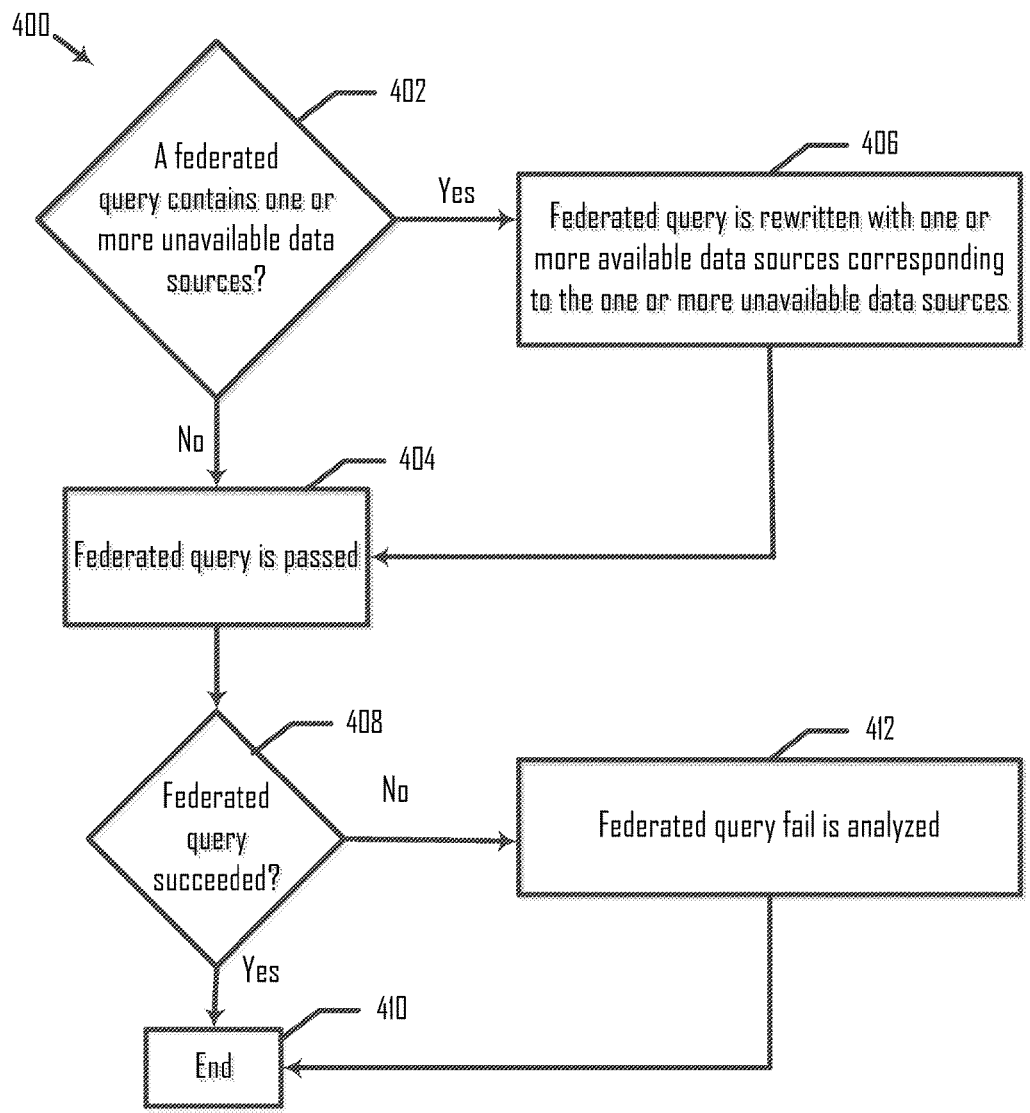
FIG. 4 is a flowchart illustrating a method of processing a federated query, according to an embodiment.

FIG. 4 is a flowchart illustrating a method 400 of processing a federated query, according to an embodiment. Method 400 is not meant to be limiting and may be used in other applications.

In FIG. 4, method 400 includes blocks 402-412. In a block 402, it is determined whether a federated query contains one or more unavailable data sources. In an example, query proxy 122 determines whether federated query 112 contains one or more unavailable data sources. In a block 404, if the federated query does not contain one or more unavailable data sources, the federated query is passed. In an example, if federated query 112 does not contain one or more unavailable data sources, query proxy 122 passes federated query 112 to data federation engine 124.

In a block 406, if the federated query contains one or more unavailable data sources, the federated query is rewritten with one or more available data sources corresponding to the one or more unavailable data sources. In an example, if federated query 112 contains one or more unavailable data sources, query rewriter 134 rewrites federated query 112 with one or more available data sources corresponding to the one or more unavailable data sources. Process flow proceeds from block 406 to block 404.

In a block 408, it is determined whether the federated query succeeded. In an example, data federation engine 124 determines whether federated query 112 succeeded. In a block 410, if the federated query succeeded, process 400 ends. In a block 412, if the federated query did not succeed, the federated query fail is analyzed. In an example, query fail analyzer 132 analyzes the federated query fail. Process flow proceeds from block 412 to block 410.

It is also understood that additional processes may be inserted before, during, or after blocks 410-412 discussed above. It is also understood that one or more of the blocks of method 400 described herein may be omitted, combined, or performed in a different sequence as desired.

Figure 5:
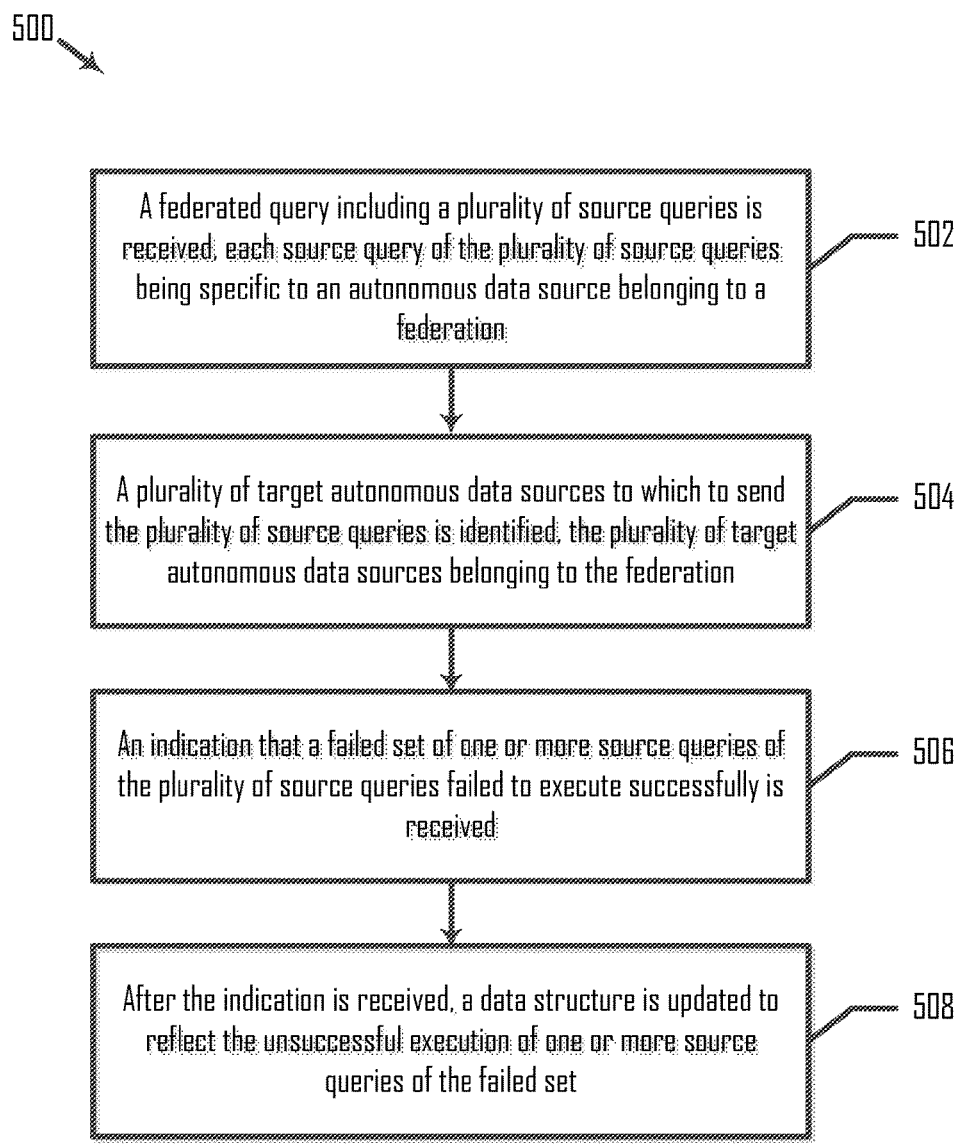
FIG. 5 is a flowchart illustrating a method of updating fail statistics, according to an embodiment.

FIG. 5 is a flowchart illustrating a method 500 of updating fail statistics, according to an embodiment. Method 500 is not meant to be limiting and may be used in other applications.

In FIG. 5, method 500 includes blocks 502-508. In a block 502, a federated query including a plurality of source queries is received, each source query of the plurality of source queries being specific to an autonomous data source belonging to a federation. In an example, query proxy 122 receives federated query 112 including source queries 202 and 204, source query 202 being specific to autonomous data source 104 belonging to a federation and source query 204 being specific to autonomous data source 106 belonging to the federation.

In a block 504, a plurality of target autonomous data sources to which to send the plurality of source queries is identified, the plurality of target autonomous data sources belonging to the federation. In an example, data federation engine 124 identifies target autonomous data sources 104 and 106 to which to send source queries 202 and 204, respectively, and data sources 104 and 106 belonging to the federation.

In a block 506, an indication that a failed set of one or more source queries of the plurality of source queries failed to execute successfully is received. In an example, query proxy 122 receives an indication that a failed set of one or more source queries of the plurality of source queries failed to execute successfully. In a block 508, after the indication is received, a data structure is updated to reflect the unsuccessful execution of one or more source queries of the failed set. In an example, after query proxy 122 receives the indication, query fail analyzer 132 updates fail statistics 138 to reflect the unsuccessful execution of one or more source queries of the failed set.

It is also understood that additional processes may be inserted before, during, or after blocks 502-508 discussed above. It is also understood that one or more of the blocks of method 500 described herein may be omitted, combined, or performed in a different sequence as desired.

VII. Example Computing System

Figure 6:
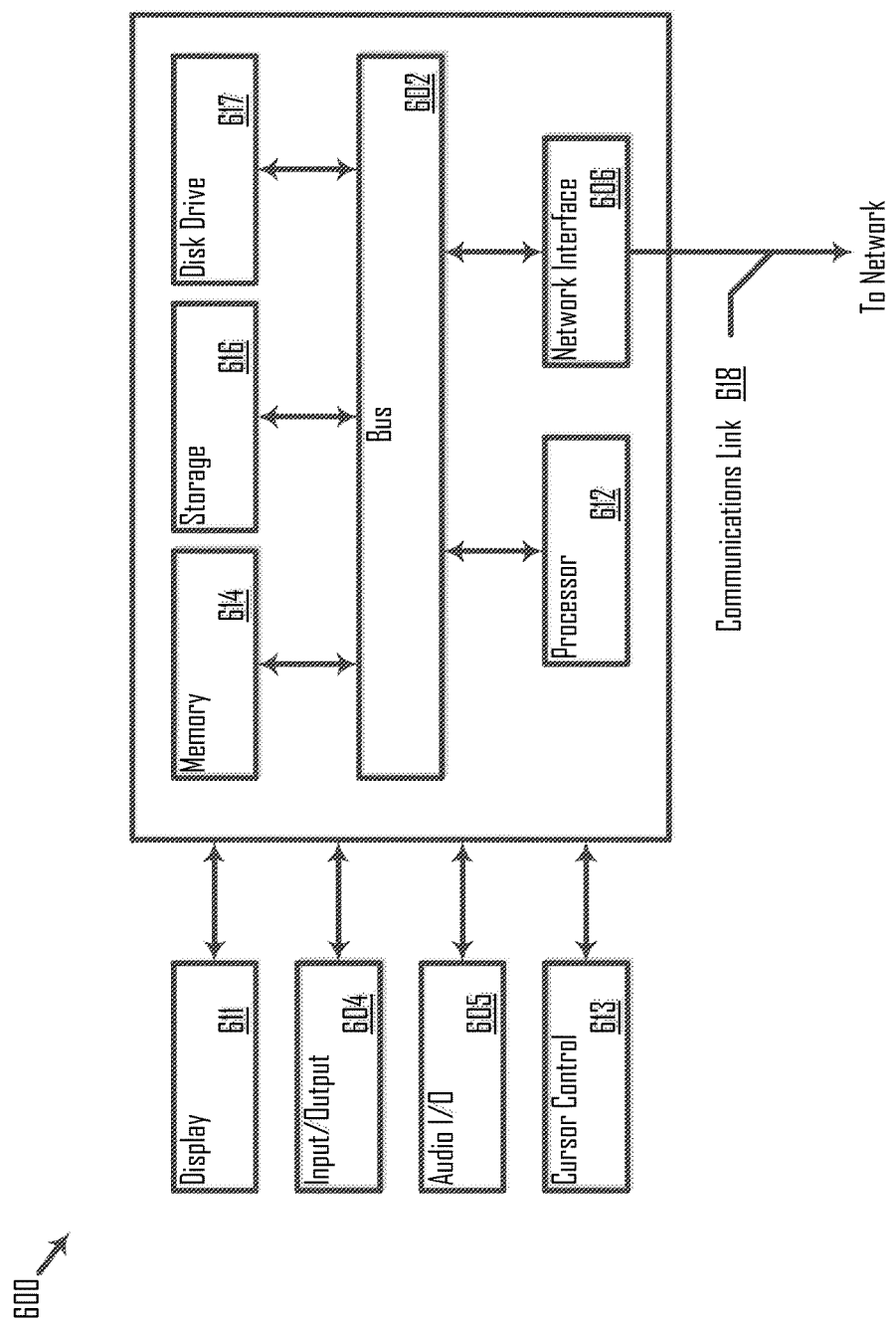
FIG. 6 is a block diagram of an electronic system suitable for implementing one or more embodiments of the present disclosure.

FIG. 6 is a block diagram of a computer system 600 suitable for implementing one or more embodiments of the present disclosure. Each of query proxy 122, data federation engine 124, query fail analyzer 132, query rewriter 134, and periodic cache manager 136 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. A processor 612, which may be a micro-controller, digital signal processor (DSP), or other processing component, processes these various signals, such as for display on computer system 600 or transmission to other devices via communication link 618. Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614.

To enable processor 612 to access data stored in the memory space of the other, an application is executed that includes instructions that manually copy data back and forth between the separate memory spaces. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/ output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable.

Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a federated query, comprising:
   receiving an indication that a first set of source queries embedded in a first federated query failed to execute successfully, each source query specifying a set of source tables stored in a target autonomous data source of a plurality of target autonomous data sources belonging to a federation, at least two source queries of the first set of source queries being specific to different data sources, and the first federated query being sent from a client;

storing the first set of source queries and metadata associated with the first set of source queries into a data structure, the first set of source queries including a first source query;

for each source query of the first set of source queries that is determined to be stored in the data structure, updating metadata of each entry corresponding to the respective source query stored in the data structure, the metadata including a number of times the respective source query has failed and further including a timestamp of the respective failure;

selecting a second set of source queries from the data structure, the second set of source queries including the first source query and having a higher probability of failure than a third set of source queries stored in the data structure;

submitting the second set of source queries to one or more target data sources;

for each result of a source query of the second set of source queries, storing the result in a cache external to the federation;

receiving an indication that the first source query embedded in a second federated query failed to execute successfully, the second federated query including a second source query, and the first source query specifying a first set of source tables stored in a first target autonomous data source;

generating a third source query by replacing a first set of source table names included in the first source query with a second set of source table names that identifies a second set of source tables, the second set of source tables being stored in the cache and storing data cached from the first set of source tables, and the first set of source table names being different from the second set of source table names;

generating a third federated query including the second and third source queries;

submitting each source query embedded in the third federated query to one or more data sources, the third source query specifying the second set of source tables and being submitted to the cache; and sending a combined result set responsive to the third federated query to the client, the combined result set including a first result set responsive to the second source query and further including a cached result set responsive to the third source query, and the cached result set being stored in the cache.

2. The method of claim 1, further including:
determining whether the first set of source queries is stored in the data structure,
wherein for each source query of the first set of source queries that is determined to not be stored in the data structure, the storing the first set of source queries includes inserting into the data structure an entry including the respective source query and first metadata of the respective source query, the first metadata including a federated query identifier that identifies the first federated query and a data source identifier that identifies a target data source to which the respective source query was sent.

3. The method of claim 1, wherein for each source query of the second set of source queries, the method further includes:
identifying a source table included in the respective source query;
determining a cache table name based on a name of the identified source table, wherein the storing includes storing the result in a table identified by the cache table name.

4. The method of claim 3, wherein the determining a cache table name includes identifying a source table name of the identified source table and adding a suffix to the source table name.

5. The method of claim 3, wherein the generating a third federated query includes:
identifying one or more source queries embedded in the second federated query that is specific to an unavailable data source;
rewriting each of the identified one or more source queries embedded in the second federated query; and
replacing the identified one or more source queries in the second federated query with one or more corresponding rewritten source queries.

6. The method of claim 5, wherein the rewriting includes replacing one or more source table names included in the identified one or more source queries with one or more source table names included in the cache.

7. The method of claim 6, wherein the replacing one or more source table names includes appending a suffix to the respective source table name.

8. The method of claim 1, wherein the metadata includes a fail count for each failed source query.

9. The method of claim 1, wherein the metadata includes a fail count for each failed source query.

10. The method of claim 9, wherein the second set of source queries has incurred more failures than the third set of source queries.

11. The method of claim 1, wherein the second federated query is different from the third federated query.

12. The method of claim 11, wherein the third federated query includes one or more source queries included in the second federated query.

13. A system for processing a federated query, comprising:
a non-transitory memory; and
one or more hardware processors coupled to the non-transitory memory and configured to read instructions from the non-transitory memory to cause the system to perform operations comprising:
receiving an indication that a first set of source queries embedded in a first federated query failed to execute successfully, each source query specifying a set of source tables stored in a target autonomous data source of a plurality of target autonomous data sources belonging to a federation, at least two source queries of the first set of source queries being specific to different data sources, and the first federated query being sent from a client;
storing the first set of source queries and metadata associated with the first set of source queries into a data structure, the first set of source queries including a first source query;
for each source query of the first set of source queries that is determined to be stored in the data structure, updating metadata of each entry corresponding to the respective source query stored in the data structure, the metadata including a number of times the respective source query has failed and further including a timestamp of the respective failure;

selecting a second set of source queries from the data structure, the second set of source queries including the first source query and having a higher probability of failure than a third set of source queries stored in the data structure;

submitting the second set of source queries to one or more target data sources;

for each result of a source query of the second set of source queries, storing the result in a cache external to the federation;

receiving an indication that the first source query embedded in a second federated query failed to execute successfully, the second federated query including a second source query, and the first source query specifying a first set of source tables stored in a first target autonomous data source;

generating a third source query by replacing a first set of source table names included in the first source query with a second set of source table names that identifies a second set of source tables, the second set of source tables being stored in the cache and storing data cached from the first set of source tables, and the first set of source table names being different from the second set of source table names;

generating a third federated query including the second and third source queries;

submitting each source query embedded in the third federated query to one or more data sources, the third source query specifying the second set of source tables and being submitted to the cache; and sending a combined result set responsive to the third federated query to the client, the combined result set including a first result set responsive to the second source query and further including a cached result set responsive to the third source query, and the cached result set being stored in the cache.

14. The system of claim 13, wherein the operations further include determining whether the first set of source queries is stored in the data structure, wherein for each source query of the first set of source queries that is determined to not be stored in the data structure, the storing the first set of source queries includes inserting into the data structure an entry including the respective source query and first metadata of the respective source query, the first metadata including a federated query identifier that identifies the first federated query and a data source identifier that identifies a target data source to which the respective source query was sent.

15. The system of claim 13, wherein for each source query of the second set of source queries, the method further includes:

identifying a source table included in the respective source query;

determining a cache table name based on a name of the identified source table, wherein the storing includes storing the result in a table identified by the cache table name.

16. The system of claim 15, wherein the determining a cache table name includes identifying a source table name of the identified source table and adding a suffix to the source table name.

17. The system of claim 16, wherein the third federated query includes one or more rewritten names of source tables included in the second federated query, and wherein the one or more rewritten names of source tables corresponds to information stored in tables that are unavailable.

18. A non-transitory machine-readable medium comprising a plurality of machine-readable instructions that when executed by one or more processors is adapted to cause the one or more processors to perform a method comprising:

receiving an indication that a first set of source queries embedded in a first federated query failed to execute successfully, each source query specifying a set of source tables stored in a target autonomous data source of a plurality of target autonomous data sources belonging to a federation, at least two source queries of the first set of source queries being specific to different data sources, and the first federated query being sent from a client;

storing the first set of source queries and metadata associated with the first set of source queries into a data structure, the first set of source queries including a first source query;

for each source query of the first set of source queries that is determined to be stored in the data structure, updating metadata of each entry corresponding to the respective source query stored in the data structure, the metadata including a number of times the respective source query has failed and further including a timestamp of the respective failure;

selecting a second set of source queries from the data structure, the second set of source queries including the first source query and having a higher probability of failure than a third set of source queries stored in the data structure;

submitting the second set of source queries to one or more target data sources;

for each result of a source query of the second set of source queries, storing the result in a cache external to the federation;

receiving an indication that the first source query embedded in a second federated query failed to execute successfully, the second federated query including a second source query, and the first source query specifying a first set of source tables stored in a first target autonomous data source;

generating a third source query by replacing a first set of source table names included in the first source query with a second set of source table names that identifies a second set of source tables, the second set of source tables being stored in the cache and storing data cached from the first set of source tables, and the first set of source table names being different from the second set of source table names;

generating a third federated query including the second and third source queries;

submitting each source query embedded in the third federated query to one or more data sources, the third source query specifying the second set of source tables and being submitted to the cache; and sending a combined result set responsive to the third federated query to the client, the combined result set including a first result set responsive to the second source query and further including a cached result set responsive to the third source query, and the cached result set being stored in the cache.

* * * * *